US011485649B2

(12) United States Patent
Sutherland et al.

(10) Patent No.: US 11,485,649 B2
(45) Date of Patent: Nov. 1, 2022

(54) SYSTEM FOR REDUCING PRODUCED WATER DISPOSAL VOLUMES UTILIZING WASTE HEAT

(71) Applicant: QUESTOR TECHNOLOGY INC., Calgary (CA)

(72) Inventors: John Joseph Sutherland, Calgary (CA); Audrey Maria Mascarenhas, Calgary (CA); Justin Edward Bouchard, Alberta (CA); Jeffrey David Nelson, Calgary (CA)

(73) Assignee: Questor Technology Inc., Calgary (CA)

( * ) Notice: Subject to any disclaimer, the term of this patent is extended or adjusted under 35 U.S.C. 154(b) by 393 days.

(21) Appl. No.: 15/255,724

(22) Filed: Sep. 2, 2016

(65) Prior Publication Data

US 2017/0066661 A1    Mar. 9, 2017

Related U.S. Application Data

(60) Provisional application No. 62/214,067, filed on Sep. 3, 2015.

(51) Int. Cl.

| C02F 1/04 | (2006.01) |
|---|---|
| B01D 1/16 | (2006.01) |
| B01D 1/14 | (2006.01) |
| B01D 1/00 | (2006.01) |
| B01D 46/44 | (2006.01) |
| B01D 53/14 | (2006.01) |
| C02F 1/00 | (2006.01) |
| C02F 101/10 | (2006.01) |
| C02F 101/32 | (2006.01) |

(52) U.S. Cl.
CPC ............ *C02F 1/048* (2013.01); *B01D 1/0058* (2013.01); *B01D 1/14* (2013.01); *B01D 1/16* (2013.01); *B01D 46/448* (2013.01); *B01D 53/14* (2013.01); *C02F 1/001* (2013.01); *B01D 2279/35* (2013.01); *C02F 2101/101* (2013.01); *C02F 2101/32* (2013.01); *C02F 2303/10* (2013.01)

(58) Field of Classification Search
None
See application file for complete search history.

(56) References Cited

U.S. PATENT DOCUMENTS

| 2,372,846 A | * | 4/1945 | Nettel | ...................... C02F 1/10 |
|---|---|---|---|---|
| | | | | 159/13.4 |
| 2,560,226 A | * | 7/1951 | Joos | ........................ C02F 1/20 |
| | | | | 261/118 |
| 3,396,100 A | * | 8/1968 | Pettefer | .................. C10G 33/00 |
| | | | | 208/188 |
| 3,584,440 A | * | 6/1971 | Vigil | ..................... B01D 47/10 |
| | | | | 96/250 |

(Continued)

FOREIGN PATENT DOCUMENTS

CA    2751720    8/2010

*Primary Examiner* — Robert J Popovics
(74) *Attorney, Agent, or Firm* — Richard D. Okimaw (57) ABSTRACT

A method and system is provided for reducing produced water disposal volumes utilizing waste heat generated by thermal oxidation. Waste heat generated by thermal oxidation can be used to vapourize excess water, and to treat and scrub the water vapour for final release into the atmosphere. The system can utilize excess heat remaining after thermal oxidation to produce water vapour.

12 Claims, 6 Drawing Sheets

(56) References Cited

U.S. PATENT DOCUMENTS

| | | | | |
|---|---|---|---|---|
| 3,624,984 A * | 12/1971 | Ferrari | B01D 53/72 | 95/199 |
| 3,704,570 A * | 12/1972 | Gardenier | B01D 47/10 | 95/227 |
| 3,716,458 A * | 2/1973 | Greenfield | C02F 11/00 | 159/17.4 |
| 3,855,079 A * | 12/1974 | Greenfield | B01D 11/0226 | 159/DIG. 25 |
| 3,907,526 A * | 9/1975 | Saleem | B01D 47/06 | 96/233 |
| 3,954,381 A * | 5/1976 | Marecaux | F23G 7/008 | 159/13.4 |
| 3,969,094 A * | 7/1976 | Dunson, Jr. | B01D 53/18 | 96/228 |
| 3,993,448 A * | 11/1976 | Lowery, Sr. | B01D 47/06 | 422/169 |
| 4,002,524 A * | 1/1977 | Damgaard-Iversen | C02F 11/13 | 159/4.06 |
| 4,024,220 A * | 5/1977 | Ostroff | B01D 53/501 | 423/243.03 |
| 4,028,077 A * | 6/1977 | Gleason | B01D 45/08 | 55/442 |
| 4,147,756 A * | 4/1979 | Dahlstrom | B01D 53/501 | 422/169 |
| 4,150,958 A * | 4/1979 | Jablin | F28C 3/06 | 201/29 |
| 4,164,547 A * | 8/1979 | Simko | B01D 53/507 | 423/244.01 |
| 4,192,659 A * | 3/1980 | Kiang | B01D 53/34 | 95/199 |
| 4,195,062 A * | 3/1980 | Martin | B01D 53/501 | 422/140 |
| 4,228,139 A * | 10/1980 | Johnson | B01D 53/501 | 423/243.1 |
| 4,249,920 A * | 2/1981 | Vesel | B01D 47/06 | 96/299 |
| 4,250,152 A * | 2/1981 | Biedell | B01D 53/501 | 423/166 |
| 4,270,974 A * | 6/1981 | Greenfield | B01D 1/14 | 554/20 |
| 4,312,646 A * | 1/1982 | Fattinger | B01D 53/34 | 96/239 |
| 4,395,338 A * | 7/1983 | Rowton | C02F 1/048 | 210/182 |
| 4,446,109 A * | 5/1984 | Bakke | B01D 53/501 | 422/168 |
| 4,507,208 A * | 3/1985 | Simon | B01D 37/03 | 210/721 |
| 4,526,764 A * | 7/1985 | Stehning | B01D 53/501 | 423/243.03 |
| 4,539,024 A * | 9/1985 | Stehning | B01D 53/501 | 55/443 |
| 4,539,184 A * | 9/1985 | Stehning | B01D 53/501 | 422/170 |
| 4,584,147 A * | 4/1986 | Stehning | B05B 1/3426 | 239/469 |
| 4,589,889 A * | 5/1986 | Spencer | B01D 53/60 | 95/174 |
| 4,619,693 A * | 10/1986 | Takai | C21C 5/527 | 266/88 |
| 4,626,264 A * | 12/1986 | Stehning | C01F 11/464 | 55/440 |
| 4,627,922 A * | 12/1986 | Viator | B03D 1/00 | 210/704 |
| 4,670,224 A * | 6/1987 | Stehning | C01F 11/464 | 261/22 |
| 4,752,399 A * | 6/1988 | Viator | B03D 1/00 | 210/704 |
| 4,762,686 A * | 8/1988 | Lehto | B01D 47/12 | 261/121.1 |
| 4,834,955 A * | 5/1989 | Mouche | B01D 53/502 | 252/180 |
| 4,853,195 A * | 8/1989 | Lehto | B01D 47/12 | 423/243.03 |
| 4,861,558 A * | 8/1989 | Lehto | B01D 47/12 | 422/106 |
| 4,882,009 A * | 11/1989 | Santoleri | B01D 1/14 | 159/901 |
| 4,986,966 A * | 1/1991 | Lehto | B01D 47/12 | 261/121.1 |
| 4,990,167 A * | 2/1991 | Stehning | B01D 53/504 | 261/115 |
| 4,996,160 A * | 2/1991 | Hausman Hazlitt | G01N 21/94 | 216/61 |
| 5,147,421 A * | 9/1992 | Yung | B01D 47/06 | 110/265 |
| 5,207,869 A * | 5/1993 | Harmoning | B01D 1/0082 | 159/901 |
| 5,207,928 A * | 5/1993 | Lerner | B01D 5/0027 | 159/48.1 |
| 5,209,762 A * | 5/1993 | Lowell | B01D 53/1425 | 95/192 |
| 5,250,267 A * | 10/1993 | Johnson | B01D 50/004 | 137/605 |
| 5,310,528 A * | 5/1994 | Kuivalainen | B01D 53/501 | 422/170 |
| 5,342,482 A * | 8/1994 | Duesel, Jr. | B01D 1/14 | 405/128.85 |
| 5,380,498 A * | 1/1995 | Kuivalainen | B01D 53/504 | 422/169 |
| 5,480,624 A * | 1/1996 | Kuivalainen | B01D 53/501 | 423/210 |
| 5,510,094 A * | 4/1996 | Bhat | B01D 53/501 | 423/243.07 |
| 5,512,072 A * | 4/1996 | Laslo | B01D 47/06 | 96/234 |
| 5,540,760 A * | 7/1996 | Risse | B01D 53/504 | 95/195 |
| 5,558,818 A * | 9/1996 | Gohara | B01D 53/504 | 261/17 |
| 5,660,615 A * | 8/1997 | Neumann | B01D 47/12 | 95/187 |
| 5,665,317 A * | 9/1997 | Laslo | B01D 53/78 | 422/171 |
| 5,695,616 A * | 12/1997 | Helfritch | C01C 1/185 | 204/157.3 |
| 5,779,999 A * | 7/1998 | Laslo | B01D 53/504 | 423/210 |
| 5,851,265 A * | 12/1998 | Burmaster | C01B 17/76 | 95/159 |
| 5,928,615 A * | 7/1999 | Strock | B01D 53/504 | 422/231 |
| 5,938,820 A * | 8/1999 | Peters | B01D 45/12 | 95/186 |
| 5,980,694 A * | 11/1999 | Apeldoorn | B01D 3/42 | 196/100 |
| 6,063,348 A * | 5/2000 | Hinke | B01D 53/56 | 423/235 |
| 6,083,302 A * | 7/2000 | Bauver, II | B01D 45/08 | 55/440 |
| 6,102,377 A * | 8/2000 | Doughty | B01D 53/79 | 261/117 |
| 6,132,494 A * | 10/2000 | Kjos | B04C 5/081 | 95/243 |
| 6,200,428 B1 * | 3/2001 | VanKouwenberg | C02F 1/048 | 202/160 |
| 6,277,343 B1 * | 8/2001 | Gansley | B01D 53/40 | 422/168 |
| 6,309,542 B1 * | 10/2001 | Kim | F23G 5/04 | 110/255 |
| 6,325,361 B1 * | 12/2001 | Van Duijn | B01D 5/0027 | 96/275 |
| 6,637,379 B2 * | 10/2003 | Hays | F22B 3/04 | 159/26.1 |
| 6,838,008 B2 * | 1/2005 | Fout | B07B 1/46 | 210/780 |

(56) References Cited

U.S. PATENT DOCUMENTS

| | | | |
|---|---|---|---|
| 6,971,238 B1 | 12/2005 | Walker | |
| 7,025,808 B2* | 4/2006 | Huber | B01D 3/14 95/211 |
| 7,163,636 B2* | 1/2007 | Spani | B01D 5/006 210/774 |
| 7,214,356 B2* | 5/2007 | Hsieh | B01D 53/79 423/235 |
| 7,214,358 B2* | 5/2007 | Ravary | B01D 53/1493 423/242.1 |
| 7,251,939 B2 | 8/2007 | Walker | |
| 7,306,776 B2* | 12/2007 | Pehkonen | B01D 53/501 137/170.1 |
| 7,351,387 B2* | 4/2008 | Pehkonen | B01D 53/502 210/198.1 |
| 7,597,803 B2* | 10/2009 | Spani | B01D 21/0012 210/180 |
| 7,722,739 B2* | 5/2010 | Haslem | E21B 21/063 202/83 |
| 7,731,854 B1* | 6/2010 | Herbst | C02F 9/00 210/651 |
| 7,842,264 B2* | 11/2010 | Cooper | B01D 47/06 423/210 |
| 7,845,314 B2* | 12/2010 | Smith | B01D 1/0058 122/379 |
| 8,066,844 B2* | 11/2011 | Duesel, Jr. | B01D 1/14 159/46 |
| 8,066,845 B2* | 11/2011 | Duesel, Jr. | C02F 1/10 210/767 |
| 8,080,166 B2* | 12/2011 | Spani | B01D 17/045 210/774 |
| 8,097,128 B1* | 1/2012 | Sherry | B05B 15/525 203/88 |
| 8,158,097 B2* | 4/2012 | DiTommaso | C02F 1/048 23/302 R |
| 8,173,025 B2* | 5/2012 | Reidhead | B01D 1/20 159/48.1 |
| 8,372,248 B1* | 2/2013 | Sherry | C02F 1/06 203/25 |
| 8,425,664 B2* | 4/2013 | Batty | F28F 1/105 95/227 |
| 8,425,666 B2* | 4/2013 | Batty | B01D 1/20 423/245.3 |
| 8,425,668 B2* | 4/2013 | Lakatos | C02F 1/12 95/266 |
| 8,460,509 B2* | 6/2013 | Lakatos | B01B 1/00 203/1 |
| 8,679,291 B2* | 3/2014 | Duesel, Jr. | B01D 1/305 210/768 |
| 8,715,498 B2 | 5/2014 | Bly, Jr. et al. | |
| 8,734,650 B2 | 5/2014 | Bradley | |
| 8,741,100 B2* | 6/2014 | Duesel, Jr. | C02F 1/048 96/275 |
| 8,746,336 B2 | 6/2014 | Minnich | |
| 8,776,879 B2 | 7/2014 | Bjorklund et al. | |
| 8,801,921 B2 | 8/2014 | Ikebe et al. | |
| 8,834,726 B2* | 9/2014 | Keister | E21B 43/40 166/308.1 |
| 8,852,393 B2* | 10/2014 | Panz | C02F 1/048 202/175 |
| 8,852,394 B2* | 10/2014 | Panz | B01D 1/14 202/175 |
| 8,894,864 B2 | 11/2014 | Karrs et al. | |
| 8,955,581 B2 | 2/2015 | Minnich | |
| 9,120,685 B2* | 9/2015 | Bjorklund | B01D 1/065 |
| 9,296,624 B2* | 3/2016 | Duesel, Jr. | C02F 1/048 |
| 9,429,317 B2* | 8/2016 | Stock | F23G 5/40 |
| 9,499,413 B2* | 11/2016 | Schmidt | C02F 1/048 |
| 9,580,343 B2* | 2/2017 | Keister | C01D 3/06 |
| 9,708,870 B2* | 7/2017 | Posa | C02F 1/004 |
| 9,719,179 B2* | 8/2017 | Marcin | C25B 15/00 |
| 9,738,545 B2* | 8/2017 | Duesel, Jr. | E21B 43/26 |
| 9,770,671 B2* | 9/2017 | Curlett | B01D 1/14 |
| 9,809,478 B2* | 11/2017 | Randal | C02F 9/00 |
| 10,000,401 B1* | 6/2018 | Famuagun | C02F 9/00 |
| 10,017,408 B1* | 7/2018 | Famuagun | B01D 15/08 |
| 10,022,647 B1* | 7/2018 | Gentry | B01D 1/0041 |
| 10,358,358 B1* | 7/2019 | Waggoner | C02F 1/12 |
| 10,435,307 B2* | 10/2019 | James | B01D 1/0082 |
| 10,441,894 B2* | 10/2019 | Curlett | B01D 47/14 |
| 10,513,444 B1* | 12/2019 | Sherry | C02F 1/06 |
| 10,597,573 B2* | 3/2020 | Rutsch | C09K 8/04 |
| 10,676,384 B2* | 6/2020 | Randal | C02F 9/00 |
| 10,773,986 B2* | 9/2020 | Biagini | C02F 9/00 |
| 10,807,884 B2* | 10/2020 | Shrader | B01D 1/14 |
| 10,875,785 B2* | 12/2020 | Cort | B01D 17/0214 |
| 10,907,461 B1* | 2/2021 | Sherry | E21B 43/34 |
| 10,927,026 B1* | 2/2021 | Eshelman | C02F 1/12 |
| 11,124,430 B2* | 9/2021 | Lolling | C02F 1/048 |
| 2005/0279715 A1* | 12/2005 | Strong | B01D 17/0211 210/774 |
| 2006/0197238 A1* | 9/2006 | Forstmanis | B05B 7/10 261/78.2 |
| 2007/0235146 A1* | 10/2007 | Haslem | E21B 21/063 159/48.1 |
| 2008/0250715 A1* | 10/2008 | Cooper | B01D 53/73 423/220 |
| 2009/0199972 A1* | 8/2009 | Lakatos | E21B 41/005 159/48.1 |
| 2009/0204419 A1* | 8/2009 | Stewart | B01D 61/025 210/652 |
| 2009/0235586 A1* | 9/2009 | Katoh | C10L 3/108 48/127.9 |
| 2009/0294074 A1* | 12/2009 | Forstmanis | B01D 1/305 159/47.3 |
| 2010/0125044 A1* | 5/2010 | Keister | C02F 1/5236 507/200 |
| 2010/0175983 A1* | 7/2010 | Batty | B01D 1/20 203/40 |
| 2010/0176064 A1* | 7/2010 | Batty | B01D 5/0039 210/151 |
| 2010/0193188 A1* | 8/2010 | Betzer Tsilevich | E21B 43/24 166/272.3 |
| 2011/0005999 A1* | 1/2011 | Randal | C02F 9/00 210/138 |
| 2011/0140457 A1* | 6/2011 | Lakatos | C02F 1/12 210/639 |
| 2011/0303367 A1* | 12/2011 | Panz | C02F 1/048 159/16.2 |
| 2012/0145386 A1* | 6/2012 | Bjorklund | B01D 1/065 166/266 |
| 2013/0087487 A1* | 4/2013 | Duesel, Jr. | B01D 1/0058 210/188 |
| 2013/0319663 A1 | 5/2013 | Buchanan | |
| 2013/0213893 A1* | 8/2013 | Posa | C02F 1/004 210/651 |
| 2013/0233786 A1* | 9/2013 | Posa | E21B 21/065 210/259 |
| 2014/0238916 A1* | 8/2014 | Duesel, Jr. | B01D 1/30 210/179 |
| 2014/0251881 A1* | 9/2014 | Duesel, Jr. | C02F 1/048 366/291 |
| 2015/0101973 A1* | 4/2015 | Moore, III | C02F 1/048 210/195.1 |
| 2015/0122498 A1* | 5/2015 | Duesel, Jr. | C02F 1/048 166/305.1 |
| 2015/0218020 A1* | 8/2015 | Miller | C02F 1/5281 210/255 |
| 2016/0258266 A1* | 9/2016 | Frick | E21B 43/34 |
| 2016/0311710 A1* | 10/2016 | Duesel, Jr. | C04B 28/00 |
| 2017/0066661 A1* | 3/2017 | Sutherland | B01D 46/448 |
| 2017/0225992 A1* | 8/2017 | Duesel, Jr. | C02F 11/14 |
| 2017/0233262 A1* | 8/2017 | Duesel, Jr. | B01D 1/14 210/179 |
| 2017/0274305 A1* | 9/2017 | Moore, III | C02F 1/16 |
| 2017/0333807 A1* | 11/2017 | Curlett | B01D 47/14 |
| 2018/0022617 A1* | 1/2018 | Cort | B01D 53/62 423/146 |
| 2018/0057384 A1* | 3/2018 | Randal | C02F 9/00 |

(56) References Cited

U.S. PATENT DOCUMENTS

2021/0017044 A1* 1/2021 Lolling .................... B04C 3/06
2021/0387867 A1* 12/2021 Lolling .................... B04C 3/06
2021/0395110 A1* 12/2021 Warner .................. C02F 1/048

* cited by examiner

SYSTEM FOR REDUCING PRODUCED WATER DISPOSAL VOLUMES UTILIZING WASTE HEAT

CROSS-REFERENCE TO RELATED APPLICATIONS

This application claims priority of U.S. provisional patent application Ser. No. 62/214,067 filed Sep. 3, 2015, which is incorporated by reference into this application in its entirety.

TECHNICAL FIELD

The present disclosure is related to the field of reducing waste water produced by hydrocarbon wells, in particular, methods and systems for reducing produced water by vapourization utilizing waste heat.

BACKGROUND

Considerable volumes of waste water are generated in all industries as a result of processing. In some sectors, such as oil and gas, water is used to fracture reservoirs during wellbore completion activity and then disposed of. Water is also produced during well production along with hydrocarbons and, after separation, disposed of alone with impurities.

Hydrocarbon production typically has a component of water that is associated with its exploration, stimulation, and recovery. This water, which is produced with the hydrocarbon, is generally referred to as "produced water", and must be separated from the produced hydrocarbons to make the produced hydrocarbons salable and usable. With the majority of the high-producing wells and wells located in infrastructure-accessible areas moving into secondary and tertiary recovery modes, the amount of produced water production is increasing, making water disposal a significant component of operating costs. In addition, as producing wells are drilled further away from any infrastructure, trucking and disposal of the produced water present an economic, logistic and production challenge which makes some areas nearly impossible to explore.

It is, therefore, desirable to provide a method and system that reduces the volume of produced water, which reduces transportation and disposal costs and requirements.

SUMMARY

In some embodiments, a method and system are provided that can utilize heat generated through the combustion of available hydrocarbons to raise the waste water stream to such a temperature that the water portion will be converted to a vapour. Sufficient control of the gas temperature, prior to contact with the waste water, is required in order to generate a concentration of a reduced waste water volume and impurities.

In some embodiments, the method and system can use thermal energy and physics in unique measures and methods to vapourize a significant portion of the waste water. The method and system can reduce the original volume of waste water into a minimal and manageable waste stream of impurities and a small volume of residual water.

Broadly stated, in some embodiments, a method can be provided for reducing water produced by a hydrocarbon-producing well, the method comprising the steps of: filtering an incoming stream of untreated produced water from the well to remove solids, hydrocarbons, and hydrogen sulphide therefrom to produce treated water; injecting the treated water into an enclosed recirculation system; heating the treated water with waste heat from a thermal oxidizer to produce saturated water vapour; scrubbing the saturated water vapour to remove minerals and ions disposed therein, thereby leaving a concentrated solution of the removed minerals and ions; and exhausting the scrubbed saturated water vapour to atmosphere.

Broadly stated, in some embodiments, the method can further comprise the step of extracting the concentrated solution from the enclosed recirculation system to produce an outgoing waste stream.

Broadly stated, in some embodiments, the method can further comprise the step of exchanging heat from the outgoing waste stream to the incoming stream of produced water.

Broadly stated, in some embodiments, the method can further comprise the step of disposing of the outgoing waste stream.

Broadly stated, in some embodiments, a system can be provided for reducing water produced by a hydrocarbon-producing well, the system comprising: a first filter configured to filter an incoming stream of untreated produced water from the well to remove solids, hydrocarbons, and hydrogen sulphide therefrom to produce treated water; a scrubbing tower enclosing an interior chamber configured to receive the treated water; an oxidizer configured to provide a source of heated flue gas to heat the treated water to produce saturated water vapour that can be introduced into the interior chamber of the scrubbing tower; a scrubbing system configured to recirculate liquid disposed in a lowermost region (or "liquid accumulation zone") of the interior chamber of the scrubbing tower through a spray nozzle disposed in the interior chamber onto the saturated water vapour in the interior chamber to precipitate minerals and ions disposed in the saturated water vapour from the saturated water vapour to produce scrubbed saturated water vapour and a concentrated solution of the removed minerals and ions in the liquid accumulation zone; and a vent fan for exhausting the scrubbed saturated water vapour to atmosphere.

Broadly stated, in some embodiments, the system can further comprise a brine pump configured for extracting the concentrated solution from the liquid accumulation zone to produce an outgoing waste stream.

Broadly stated, in some embodiments, the system can further comprise a storage tank configured for receiving the outgoing waste stream.

Broadly stated, in some embodiments, the scrubbing system can further comprise a recirculation pump configured for pumping the concentrated solution through the spray nozzle.

Broadly stated, in some embodiments, the system can further comprise a temperature controller configured to operate the vent fan to exhaust scrubbed saturated water vapour from the interior chamber of the scrubbing tower when a temperature of the heated flue gas reaches a predetermined temperature.

Broadly stated, in some embodiments, the scrubbing tower can further comprise a second filter configured to filter the scrubbed saturated water vapour being exhausted from the interior chamber of the scrubbing tower.

DETAILED DESCRIPTION OF EMBODIMENTS

In some embodiments, methods and systems can be provided that can address three (3) problems in the hydrocarbon production process: 1) the reduction of produced water to be handled; 2) the reduction of overall production costs; and 3) the reduction of water removed from the surface water cycle.

Figure 1:
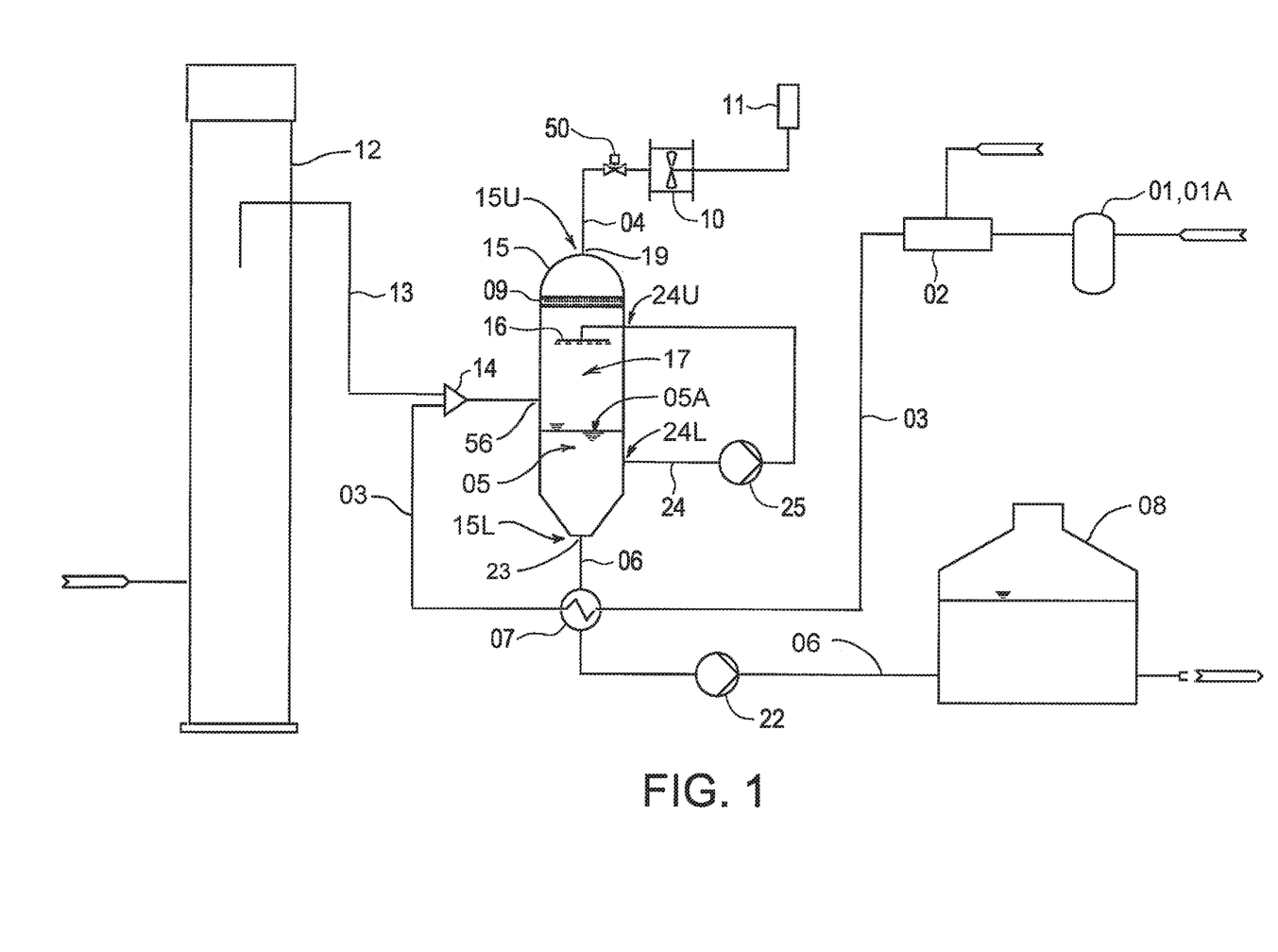
FIG. 1 is a block diagram depicting a process flow diagram of one embodiment of an evaporation process.
Figure 2:
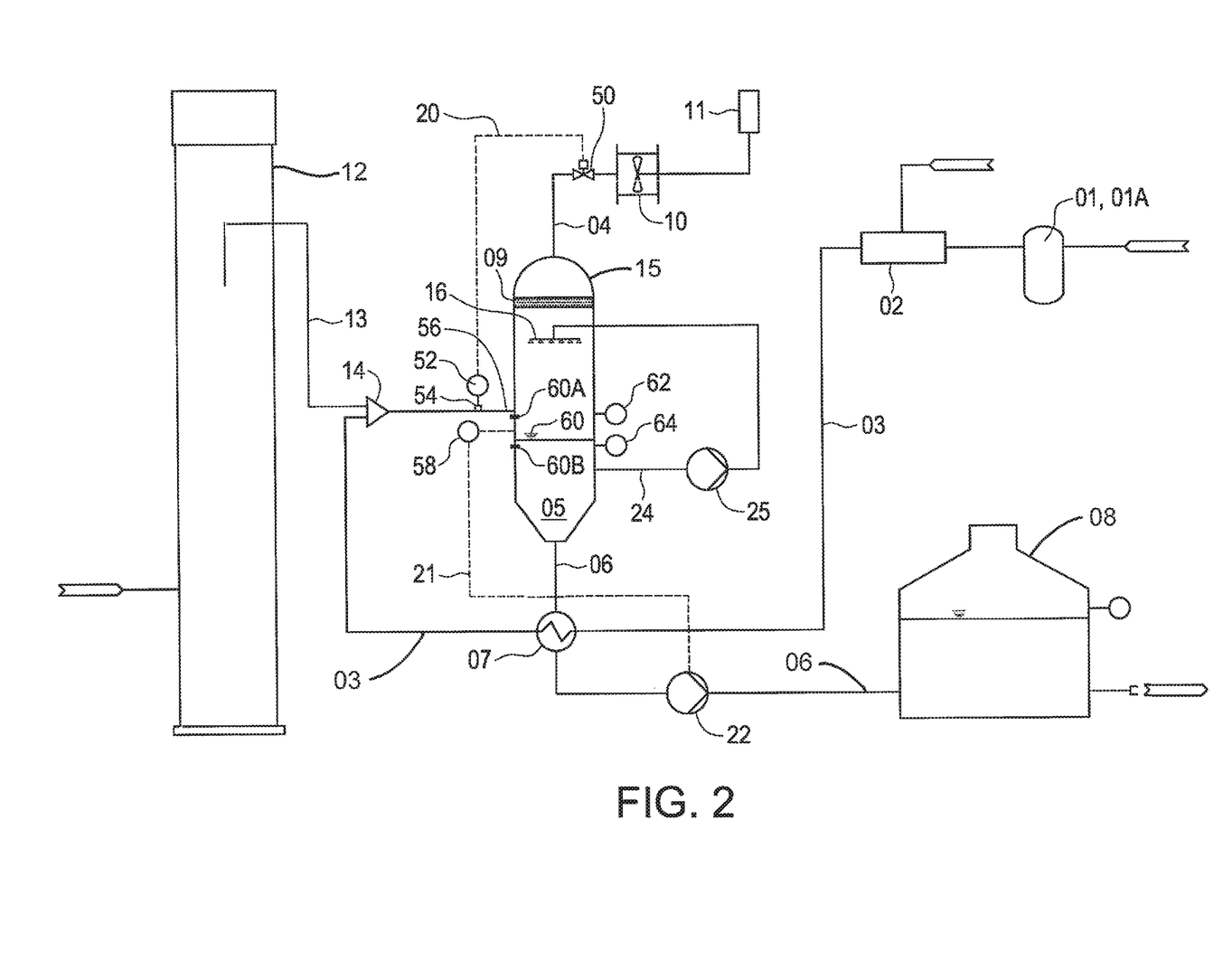
FIG. 2 is a block diagram depicting a piping and instrumentation diagram of the process of FIG. 1.

FIGS. 1 and 2 illustrate one embodiment of a system for reducing the amount of final produced water required to be disposed of during hydrocarbon well production. The illustrated system includes a scrubbing tower 15 which has an upper end 15U and a lower end 15L, and which encloses an interior chamber 17. Scrubbing tower 15 further has a flue gas inlet 56 located between upper and lower ends 15U and 15L, enabling the flow of flue gas from an oxidizer 12 into interior chamber 17 via flue gas ducting 13. A mixing nozzle 14 is provided in the flue gas ducting 13 at or upstream of flue gas inlet 56. A pipeline 03 for conveying a flow of produced water connects to the flue gas ducting 13 at or upstream of mixing nozzle 14, such that mixing nozzle 14 can mix a flow produced water from pipeline 03 into a flow of flue gas in flue gas ducting 13, such that waste heat from the flue gas will vapourize at least a portion of the produced water, resulting in a water-saturated gas stream flowing into interior chamber 17 of scrubbing tower 15 via flue gas inlet 56.

Figure 4A:
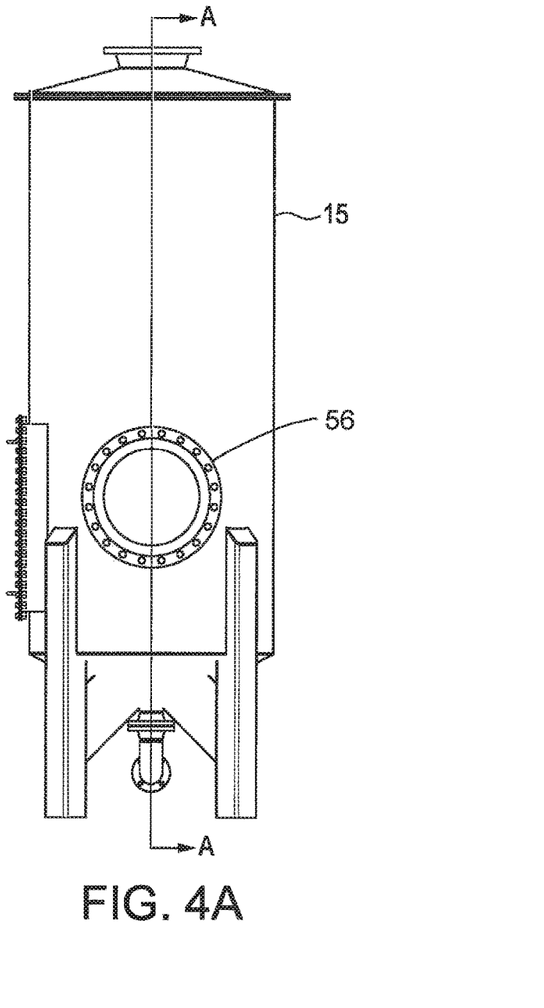
FIG. 4A is a side elevation view depicting the scrubbing tower of FIG. 3.
Figure 4B:
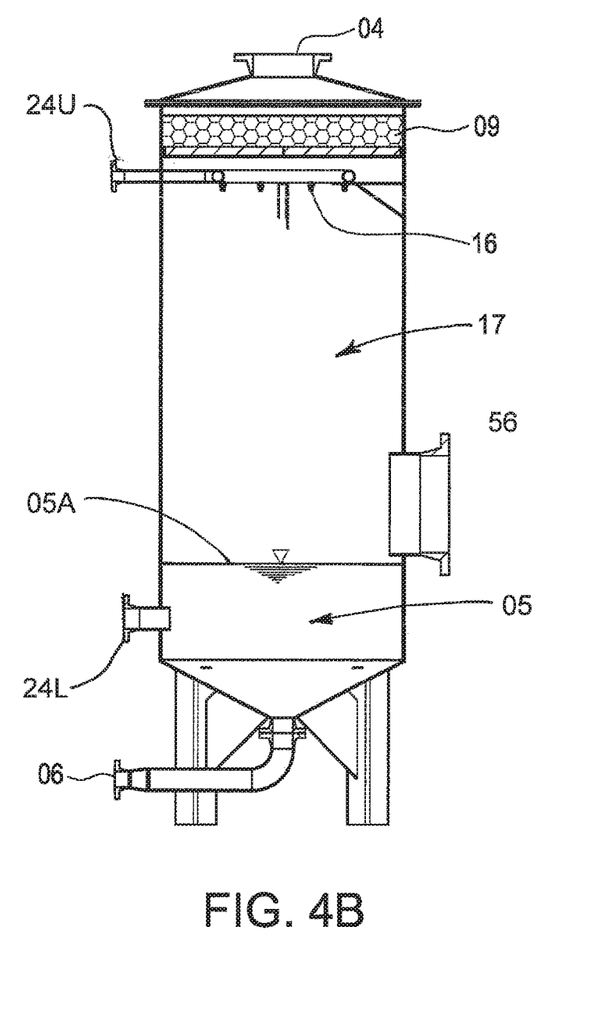
FIG. 4B is a cross-section view depicting the scrubbing tower of FIG. 4A along section lines A-A.

As best seen in FIGS. 1, 2, and 4B, a vapour outlet 19 is provided at upper end 15U of scrubbing tower 15, with a coalescing filter 09 being provided below vapour outlet 19 within interior chamber 17 of scrubbing tower 15. A vent line 04 extends outward from vapour outlet 19, and connects to an induced draft fan 10 that is operable to draw water-saturated gas entering interior chamber 17 upward through filter 09, such that clean water vapour exiting upward through filter 09 is conveyed via vapour outlet 19 and vent line 04 to a vent 11.

Minerals and ions and unvapourized water from the water-saturated gas stream entering interior chamber 17 of scrubbing tower 15 will drop out and accumulate in a lowermost region of interior chamber 17. This lowermost region of interior chamber 17 will be alternatively referred to herein as liquid accumulation zone 05. A fluid outlet 23 is provided at lower end 15L of scrubbing tower 15 for discharging accumulated liquid out of liquid accumulation zone 05 into a waste line 06 and onward to a fluid storage tank 08.

The upper boundary of liquid accumulation zone 05—i.e., the maximum level of the surface 05A of liquid accumulating in liquid accumulation zone 05—may vary with operating conditions, and may be controlled by a suitable liquid level control system (as explained in greater detail later herein), and typically will be set below flue gas inlet 56 (as shown in FIGS. 1, 2, and 4A). When liquid surface 05A reaches or approaches a preset maximum level, the liquid level control system will activate a brine pump 22 to pump liquid out of liquid accumulation zone 05 as required to lower liquid surface 05A to an appropriate level.

As shown in FIGS. 1 and 2, the produced water stream in pipeline 03 can be treated prior to reaching mixing nozzle 14 by filtering out particulates and hydrocarbon droplets by means of a coalescing filter 01A disposed in a filter housing 01. In some embodiments, 'sweetener' chemicals can be added to the produced water stream at a point 02 downstream of filter 01A to bond and render inert any hydrogen sulfide atoms in solution.

In some embodiments, the sweetener chemicals can comprise one or more compounds from the class of compounds known as alkanolamines, as well known to those skilled in the art, which can further comprise one or more of monoethanolamine ("MEA"), diglycolamine ("DGA"), diethanolamine ("DEA"), diisopropanolimaine ("DIPA"), triethanolamine ("TEA"), and methyldiethanolamine ("MDEA").

In some embodiments, the sweetener chemicals can comprise physical solvents, which can further comprise one or more of dimethyl ether of polyethylene glycol, propylene carbonate and N-methylpyrrolidone. In some embodiments, the sweetener chemicals can comprise triazine used in a scavenger process, as well known to those skilled in the art. In some embodiments, the sweetener chemicals can comprise one or more of iron oxide, wood chips impregnated with iron oxide, walnut shells, and walnut shell fragments.

The treated produced water can then be introduced into mixing nozzle 14, where it can be mixed and heated with flue gas from oxidizer 12 via vent ducting 13 to vapourize the treated produced water to release a stream of clean water vapour through vent line 04, and to concentrate the minerals and ions in liquid accumulation zone 05 of interior chamber 17 of scrubbing tower 15. The highly concentrated solution in liquid accumulation zone 05 can then be released through liquid outlet 23 into waste line 06, and then cooled in a cross-flow heat exchanger 07 prior to storage in storage tank 08. Water vapour in interior chamber 17 can be drawn through coalescing filter 09 by induced draft fan 10, and can then be released through vent 11. The flue gas from thermal oxidizer 12 can be drawn through vent ducting 13, and then cooled by water injection at mixing nozzle 14 and drawn into interior chamber 17 of scrubbing tower 15. The water-saturated stream can then be pulled through scrubbing tower 15 where the bottoms are distributed through spray nozzles 16 to scrub any particulate, and to coalesce smaller droplets to prevent carry-over.

In some embodiments, oxidizer 12 can comprise a direct-fired thermal oxidizer used in another industrial application. As an example, oxidizer 12 can comprise a burner system used to dispose of associated gas and produced water from a gas well that is not tied into a pipeline transporting the associated gas away from the well. In some embodiments, oxidizer 12 can comprise a heater that cleanly combusts the associated gas from the gas well that can be used to vapourize the produced water from the well.

FIG. 2 is a piping and instrumentation diagram illustrating one embodiment of the piping, control, and operation that can be used with the methods and systems described herein. The inlet temperature of flue gas can be controlled by a temperature control loop 20 which can control the position of a temperature control valve ("TCV") 50 to pull more or less flue gas through vent ducting 13.

In some embodiments, the inlet temperature to scrubbing tower 15 can be regulated by the amount of flue gas that can be pulled in from vent ducting 13. In some embodiments, TCV 50 can be a damper or flow control device. A temperature controller ("TC") 52 can receive a signal from a thermocouple 54 disposed at flue gas inlet 56 of scrubbing tower 15, and send a control signal via temperature control loop 20 to a motor-controlled damper disposed in TCV 50. If the temperature at flue gas inlet 56 is below a predetermined low temperature, temperature control loop 20 can send a signal to TCV 50 to open the damper disposed therein. Conversely, if the temperature at flue gas inlet 56 is above a predetermined high temperature, temperature control loop 20 can send a signal to TCV 50 to close the damper disposed therein.

In some embodiments, TCV 50 can comprise a model HCDR-050 damper manufactured by Greenheck Fan Corporation of Schofield, Wis., U.S.A. In some embodiments, TCV 50 can further comprise a model EFB24-SR-S N4 actuator manufactured by Belimo Automation AG of Switzerland to operate the damper therein. In some embodiments, temperature control loop 20 can comprise an EZ-Zone model PM4C1F1 PID controller manufactured by Watlow Electric Manufacturing Company of St. Louis, Mo., U.S.A. In some embodiments, thermocouple 54 can comprise a model RTD RT7 resistance temperature detector probe manufactured by Aircom Instrumentation Ltd. of Edmonton, Alberta, Canada.

The overall level of liquid in liquid accumulation zone 05 can be controlled by a level control loop 21, which can increase or decrease the speed of concentrated brine pump 22. In some embodiments, as the level of liquid in liquid accumulation zone 05 increases, a liquid level switch 60 can send a signal to a level controller ("LC") to turn on brine pump 22 so as to drain the liquid from liquid accumulation zone 05. Once the liquid level in liquid accumulation zone 05 drops below a predetermined level, liquid level switch 60 can send a signal to LC 58 to turn off brine pump 22.

Figure 6:
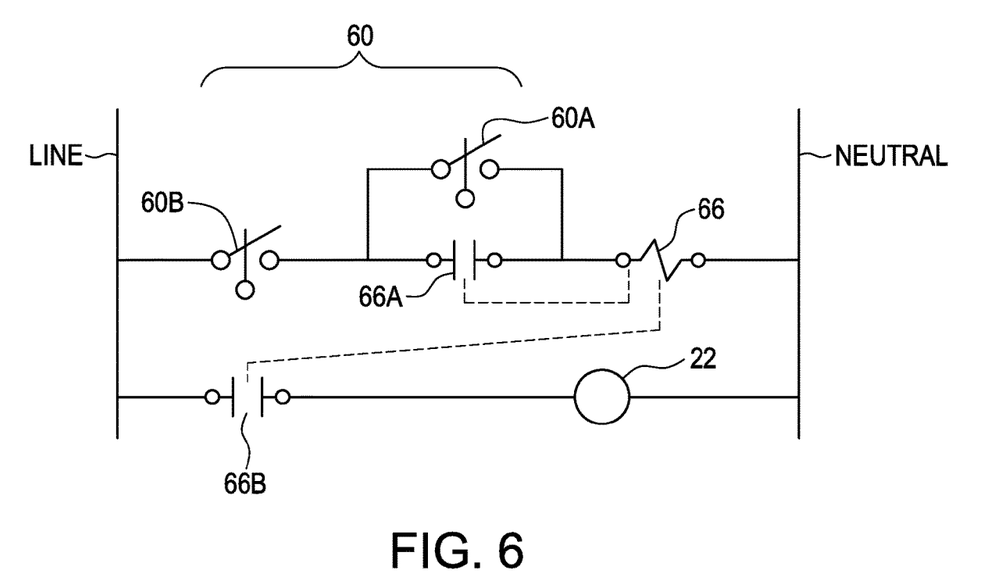
FIG. 6 is a block diagram depicting one embodiment of a level controller for use with the processes of FIGS. 1 and 2.

Referring to FIG. 6, one embodiment of fluid level switch 60 is shown for use with LC 58. In some embodiments, switch 60 can comprise a top or high-level switch 60A connected in series with a bottom or low-level switch 60B, with high-level switch 60A being further connected in series with a coil of a relay 66, and with the combination of these components being connected between a line and a neutral of AC power. A contact 66A of relay 66 can be connected in parallel with high-level switch 60A.

In some embodiments, a contact 66B of relay 66 can connected in series with brine pump 22, with the combination of these components being connected between the line and neutral of the AC power. In some embodiments, when the liquid level in liquid accumulation zone 05 is high enough to close high-level switch 60A, low-level switch 60B is also closed. Under this condition, relay 66 can be energized to close contact 66B to provide AC power to brine pump 22 to pump liquid out of liquid accumulation zone 05. When relay 66 energizes, contact 66A also closes to keep relay 66 energized when the liquid level in liquid accumulation zone 05 falls below high-level switch 60A, thus making it go open circuit.

As liquid continues to be pumped out of liquid accumulation zone 05 by brine pump 22, the liquid level will eventually drop below the level of low-level switch 60B, thus making it go open circuit to de-energize relay 66, which will, in turn, open contacts 66A and 66B, which will disconnect AC power to brine pump 22, and thus make it stop pumping liquid out of liquid accumulation zone 05.

In some embodiments, the system can a comprise high liquid level sensor ("LSH") 62 and a low liquid level sensor ("LSL") 64 disposed on scrubbing tower 15, wherein LSH 62 and LSL 64 can be operably connected to LC 58 to sense when liquid in liquid accumulation zone 05 reaches predetermined high and low levels. In the event that brine pump 22 fails to drain the liquid in liquid accumulation zone 05 such that the level of the liquid therein can be sensed by LSH 62, LSH 62 can send a signal to LC 58 to generate a high liquid level alarm whereby the system can be shut down. In the event that there is insufficient liquid in liquid accumulation zone 05 to recirculate, such that the level of the liquid therein can be sensed by LSL 64, LSL 64 can send a signal to LC 58 to generate a low liquid level alarm whereby the system can be shut down.

In some embodiments, LC 58 can comprise a model 1012DQ2X Level Control Panel as manufactured by Alderon Industries, Inc. of Hawley, Minn., U.S.A. In some embodiments, liquid level switch 60 can comprise a model 2110 Liquid Level Switch as manufactured by Emerson Process Manufacturing Rosemount Inc. of Chanhassen, Minn., U.S.A. In some embodiments, one or both of LSH 62 and LSL 64 can comprise a model 324D proximity sensor as manufactured by John C. Ernst & Co., Inc. of Sparta, N.J., U.S.A.

Figure 3:
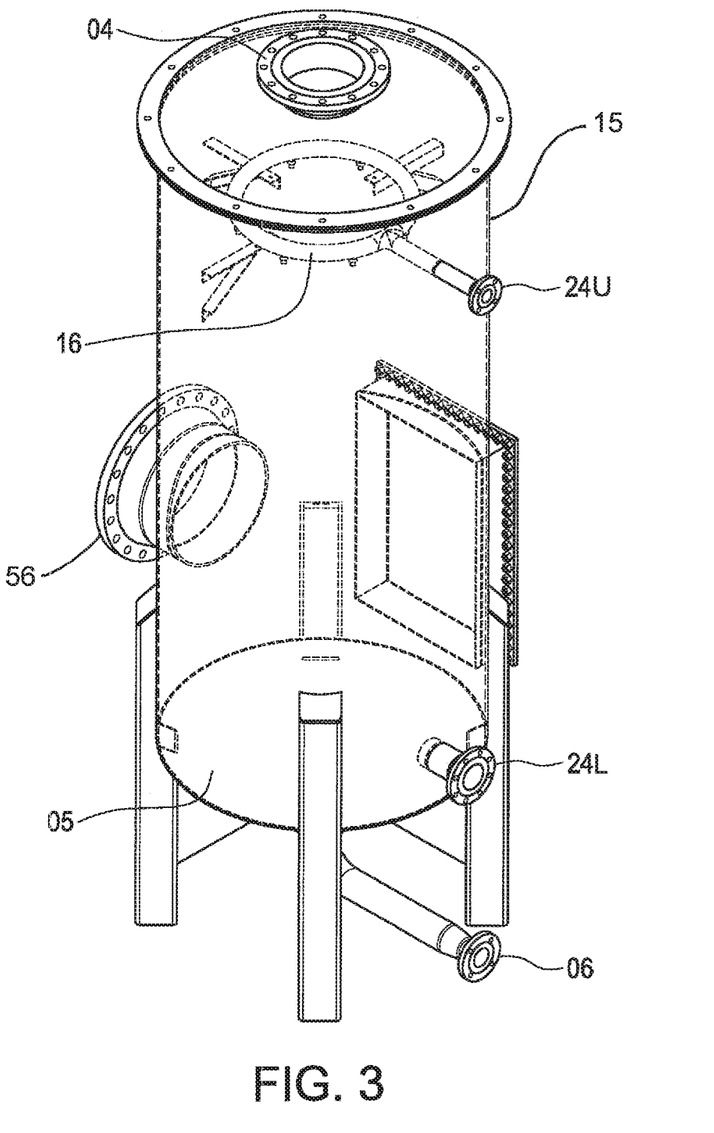
FIG. 3 is an isometric view depicting a scrubbing tower for use in the process of FIG. 1 and FIG. 2.

FIG. 3 is an isometric view of scrubbing tower displaying the details and configuration of scrubbing tower 15, interior chamber 17 of scrubbing tower 15, and liquid accumulation zone 05 forming part of interior chamber 17, with flue gas inlet 56 for connecting with flue gas ducting 13, a wash stream line 24 extending from a lower port 24L on scrubbing tower 15 in fluid communication with liquid accumulation zone 05 to an upper port 24U on scrubbing tower 15 in fluid communication with spray nozzles 16 disposed in an upper region of interior chamber 17 of scrubbing tower 15, vent line 04, and waste line 06. As shown in FIGS. 1 and 2, a recirculation pump 25 is provided for recirculating liquid from liquid accumulation zone 05 through wash stream line 24 to spray nozzles 16.

FIG. 4A is a side elevation view of scrubbing tower 15. FIG. 4B is a cross-section view of scrubbing tower 15, showing the details of spray nozzles 16, coalescing filter 09 and liquid accumulation zone 05 of interior chamber 17 of scrubbing tower 15. In some embodiments, coalescing filter 09 can comprise a corrosion-resistant vane pack demister. In some embodiments, coalescing filter 09 can comprise any structured material comprising sufficient pressure drop, surface area, and corrosion resistance properties, as well known to those skilled in the art, to be used as a coalescing filter. In some embodiments, coalescing filter 09 can comprise a model LDP Vane Type Mist Extractor as manufactured by Fabco Products, Inc. of Hawkins, Tex., U.S.A.

Figure 5A:
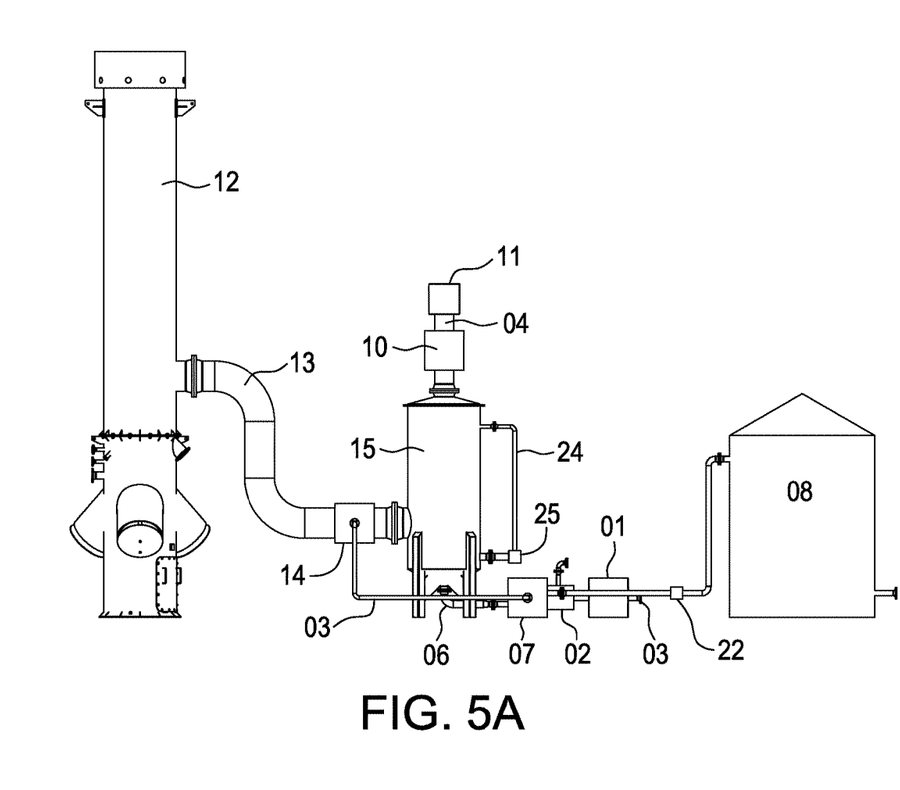
FIG. 5A is a side elevation view depicting one embodiment of a vapourizing system for use in the process of FIG. 1.
Figure 5B:
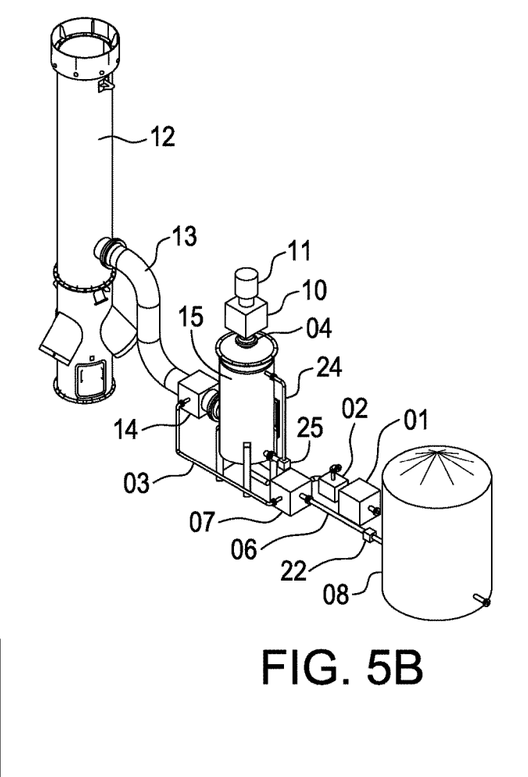
FIG. 5B is an isometric view depicting the vapourizing system of FIG. 5A.

FIGS. 5A and 5B illustrate one embodiment of a complete general arrangement showing all the components included in the methods and systems described herein. In some embodiments, the systems described herein can be mounted on a structural skid, which can take any size or shape that allows for the systems described herein to be safely and securely transported and installed at location, including the addition of a number of structural skids if required by transportation logistics or facility layout.

In some embodiments, coalescing filter 01A can comprise any size and media required to filter sediment, hydrocarbons, and impurities out of the produced water stream carried by pipeline 03, as well known to those skilled in the art. In some embodiments, filter housing 01 and filter 01A can comprise a bag filter having a corrosion-resistant strainer basket, the size of which can depend on the particulate loading of the disposal waster. In some embodiments, filter 01A can comprise any structured material with an adequate mesh size, surface area, and corrosion resistance properties can be used as well known to those skilled in the art. In some embodiments, filter 01A can comprise a model L44121NB615 bag filter housing and a model BT-4-ML-O-40-6 strainer basket, as both manufactured by Pentair, Inc. of Milwaukee, Wis., U.S.A.

In some embodiments, thermal oxidizer 12 can be any size thermal oxidizer with sufficient excess heat available to flash the required amount of water, as well known to those skilled in the art. In some embodiments, vent ducting 13 can be any size to accommodate the required flue gas flow from thermal oxidizer 12. In some embodiments, mixing nozzle 14 can comprise of single or multiple inlet spray nozzles and mixers to accommodate the design flow rates and atomization requirements in the inlet stream. In some embodiments, scrubbing tower 15 can be any size to accommodate the design flow rates and the emissions requirements, be constructed from either coated carbon steel or any exotic material that can resist the corrosive nature of the fluids, as well known to those skilled in the art.

In some embodiments, spray nozzle assembly 16 can comprise any number and pattern of nozzles required to get appropriate coverage and droplet size to remove entrained and undersized droplets and any other atomized contaminants. Discharge vent 11 and induced draft fan 10 can be of any size and design that can handle the nature and flow rates of the water vapour stream flowing in vent line 04. Recirculation pump 25 and wash stream line 24 can be any size or type that can accommodate wash stream material and flow requirements.

In some embodiments, heat exchanger 07 can be of any type and size as required (including, without limitation, shell and tube, plate and frame and pin) to provide adequate cooling for the highly concentrated brine stream flowing through waste line 06. Concentrated brine pump 22 can be of any size or type required to handle the concentrated brine stream and the flow rates required. Storage tank 08 can be of any size and material as required to contain the concentrated brine stream from waste line 06 and provide sufficient storage to handle any logistical concerns.

Although a few embodiments have been shown and described, it will be appreciated by those skilled in the art that various changes and modifications can be made to these embodiments without changing or departing from their scope, intent, or functionality. The terms and expressions used in the preceding specification have been used herein as terms of description and not of limitation, and there is no intention in the use of such terms and expressions of excluding equivalents of the features shown and described or portions thereof, it being recognized that the invention is defined and limited only by the claims that follow.

We claim:

1. A scrubbing tower system for reducing the disposal volume of a produced water stream, the system comprising:
    a tank having a wall enclosing an interior chamber, the wall extending between top and bottom ends of the tank, wherein a lower portion of the interior chamber defines a liquid accumulation region;
    a flue gas inlet conduit extending through the wall, the flue gas inlet conduit being fluidically connected to a combustion exhaust gas source to direct a flow of received combustion exhaust gas into the interior chamber;
    a vent extending from the top of the tank for releasing water vapor from the interior chamber;
    a water supply conduit extending from a produced water source;
    a mixing nozzle within the flue gas inlet conduit and in fluidic communication with the water supply conduit, said mixing nozzle being capable of mixing a produced water stream from the water supply conduit with the received exhaust gas prior to entering the interior chamber;
    a concentrate removal port located at the lowermost bottom end of the tank including a concentrate line extending to a collection tank for receiving a quantity of concentrated liquid solution accumulated in the liquid accumulation region of the interior chamber;
    a scrubbing system comprising: a spray nozzle assembly positioned within the interior chamber above the flue gas inlet conduit;
    a wash line extending from the liquid accumulation region to the spray nozzle;
    and a pump within the wash line for pumping liquid from the liquid accumulation region to the spray nozzle;
    a temperature sensor located within the flue gas inlet conduit for measuring the temperature of the combustion exhaust gas passing therethrough; and
    a flow control valve in the vent for controlling the flow rate through the vent in response to a temperature measured by the temperature sensor so as to maintain the inlet temperature within a desired temperature range.

2. The scrubbing tower system as set forth in claim 1, further comprising a second pump in the concentrate line for pumping the concentrated liquid solution from the liquid accumulation region through the concentrate removal port to the collection tank.

3. The scrubbing tower system as set forth in claim 2, further comprising a heat exchanger operable to transfer heat from the concentrate line to the produced water stream.

4. The scrubbing tower system as set forth in claim 2, further comprising liquid level control means, for controlling the level of liquid in the liquid accumulation zone.

5. The scrubbing tower system as set forth in claim 2, wherein the liquid level control means comprises a level controller, a high liquid level sensor, and a low liquid level sensor, said level controller being configured to activate or deactivate the second pump in response to signals received from the high liquid level sensor and the low liquid level sensor.

6. The scrubbing tower system as set forth in claim 1, further comprising:
    (a) a vent fan within the vent for exhausting a scrubbed saturated water vapor stream from the interior chamber of the tank; and
    (b) a temperature controller configured to operate the vent fan to exhaust the scrubbed saturated water vapor stream from the interior chamber of the tank when a temperature of the flue gas at the flue gas inlet reaches a predetermined temperature.

7. The scrubbing tower system as set forth in claim 6, further comprising a coalescing filter.

8. The scrubbing tower system as set forth in claim 7, further comprising a second filter through which the produced water stream must pass upstream of the mixing nozzle.

9. The scrubbing tower system as set forth in claim 8, further comprising means for injecting one or more selected sweetener chemicals into the produced water stream at a point downstream of the second filter and upstream of the mixing nozzle.

10. The scrubbing tower system as set forth in claim 1, further comprising a first filter disposed within the interior chamber of the tank above the spray nozzle assembly such that the scrubbed saturated water vapor exiting the interior chamber of the scrubbing tower via the vapor outlet must first pass through the first filter.

11. The scrubbing tower system as set forth in claim 1 wherein the combustion exhaust gas source is an oxidizer which provides the flue gas.

12. The scrubbing tower system as set forth in claim 1 wherein the wash line is in fluid communication with the liquid accumulation region at an elevation above the concentrate removal port.

\* \* \* \* \*